(No Model.)   5 Sheets—Sheet 1.

E. E. CLAUSSEN.
MACHINE FOR MAKING TWIST DRILLS.

No. 566,966.   Patented Sept. 1, 1896.

Witnesses:
H. Mallner
O. Mutter

Inventor
Edward E. Claussen

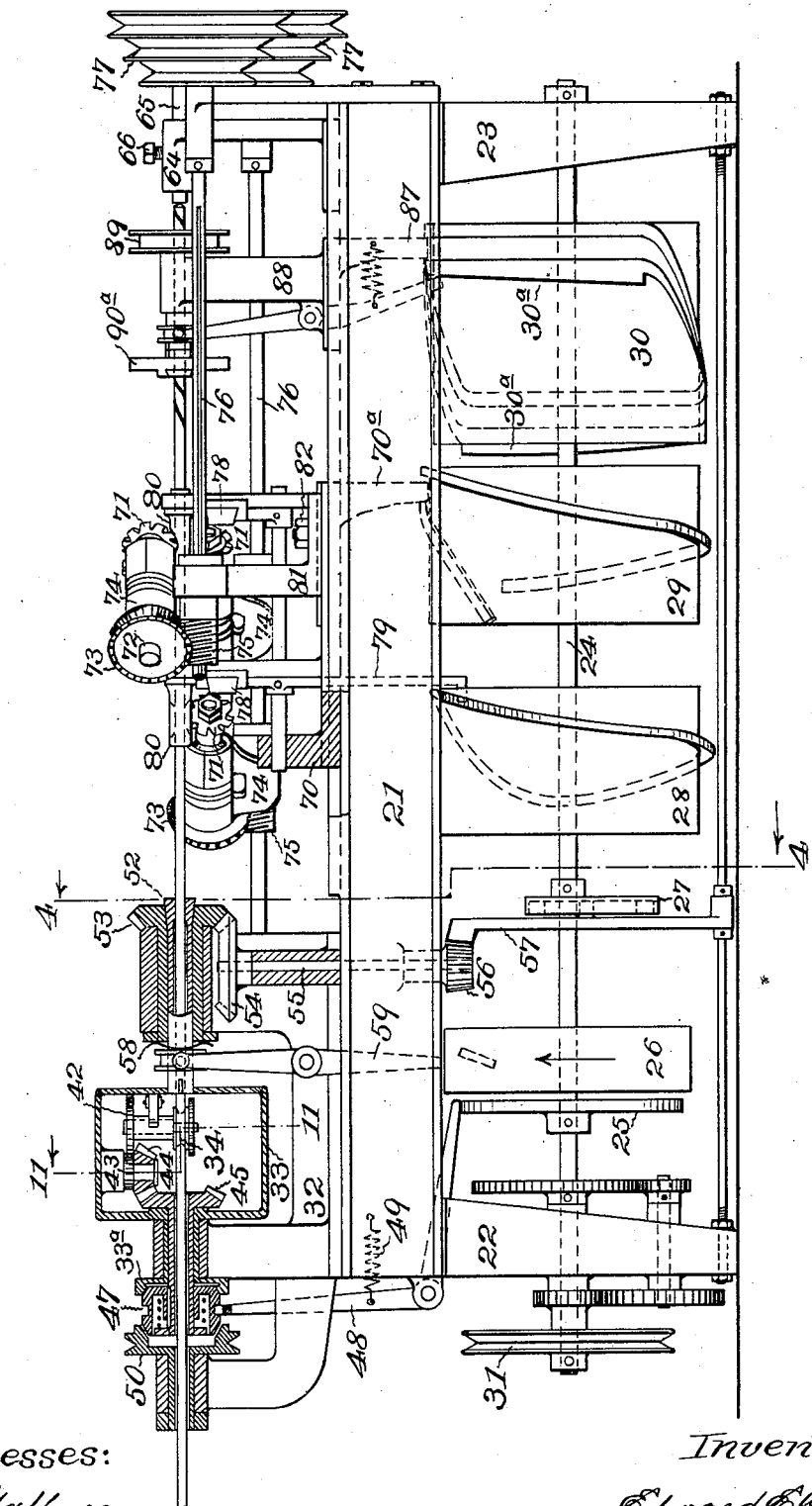

(No Model.) 5 Sheets—Sheet 3.
E. E. CLAUSSEN.
MACHINE FOR MAKING TWIST DRILLS.

No. 566,966. Patented Sept. 1, 1896.

Witnesses:
H. Mallner
A. Mutter

Inventor:
Edward E. Claussen

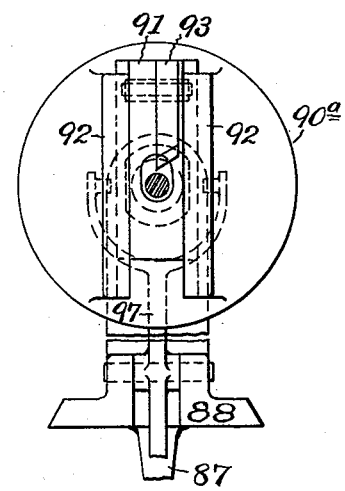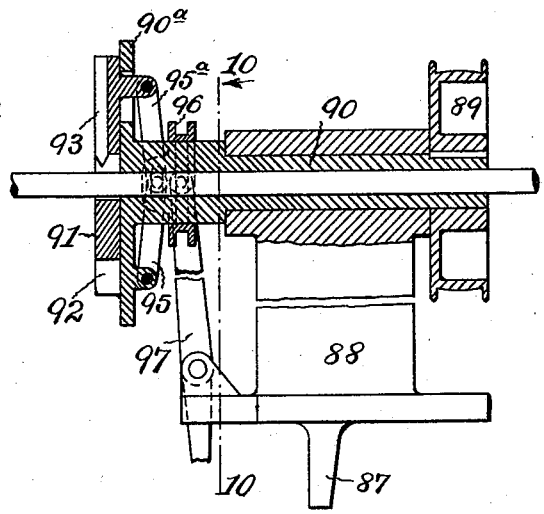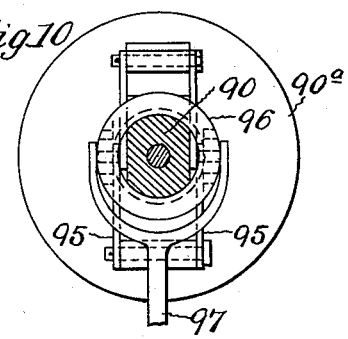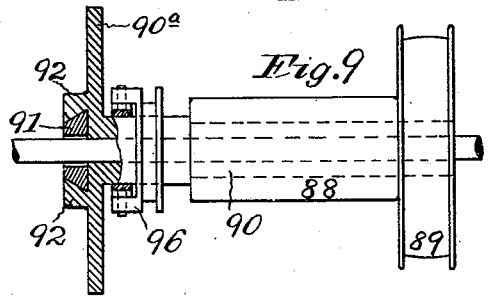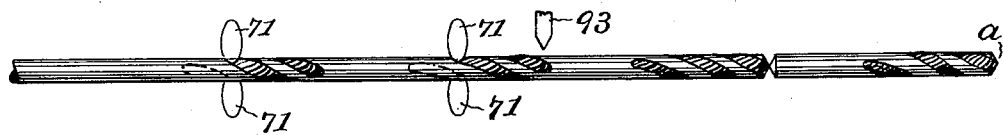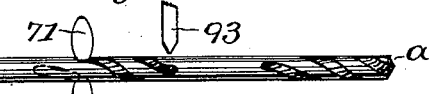

(No Model.) 5 Sheets—Sheet 5.

E. E. CLAUSSEN.
MACHINE FOR MAKING TWIST DRILLS.

No. 566,966. Patented Sept. 1, 1896.

Witnesses:
H. Mallmer
A. Mutter

Inventor:
Edward E. Claussen

UNITED STATES PATENT OFFICE.

EDWARD E. CLAUSSEN, OF HARTFORD, CONNECTICUT.

MACHINE FOR MAKING TWIST-DRILLS.

SPECIFICATION forming part of Letters Patent No. 566,966, dated September 1, 1896.

Application filed May 16, 1895. Serial No. 549,504. (No model.)

*To all whom it may concern:*

Be it known that I, EDWARD E. CLAUSSEN, a citizen of the United States, residing at Hartford, in the county of Hartford and State of Connecticut, have invented certain new and useful Improvements in Machines for Making Twist-Drills, of which the following is a full, clear, and exact specification.

This invention has reference to the manufacture of twist-drills, in which the spiral grooves have an increasing pitch and a decreasing depth, measured from the point of the drill toward the shank, directly from a wire rod.

In machines of this class it has been the usual custom to cut the wire from which the drills are made into blanks of the length of the drill, insert the blank into the chuck of the grooving or twist-drill machine, center said blank so that it will run true, cut the spiral grooves, return the blank-carrying mechanisms to their starting position, which is in most instances done by hand, and remove the grooved blank.

My present invention relates, therefore, not only to improvements of devices and arrangements which enable me to use a wire rod and cut the spiral grooves by a single pair of cutters, but to cut simultaneously, by a plurality of pairs of cutters, the grooves and then sever the blanks thus formed from that rod, and so cheapen and expedite the process of manufacture by unskilled workmen, and dispense with the necessity of inserting each blank to be operated on.

Figure 1:
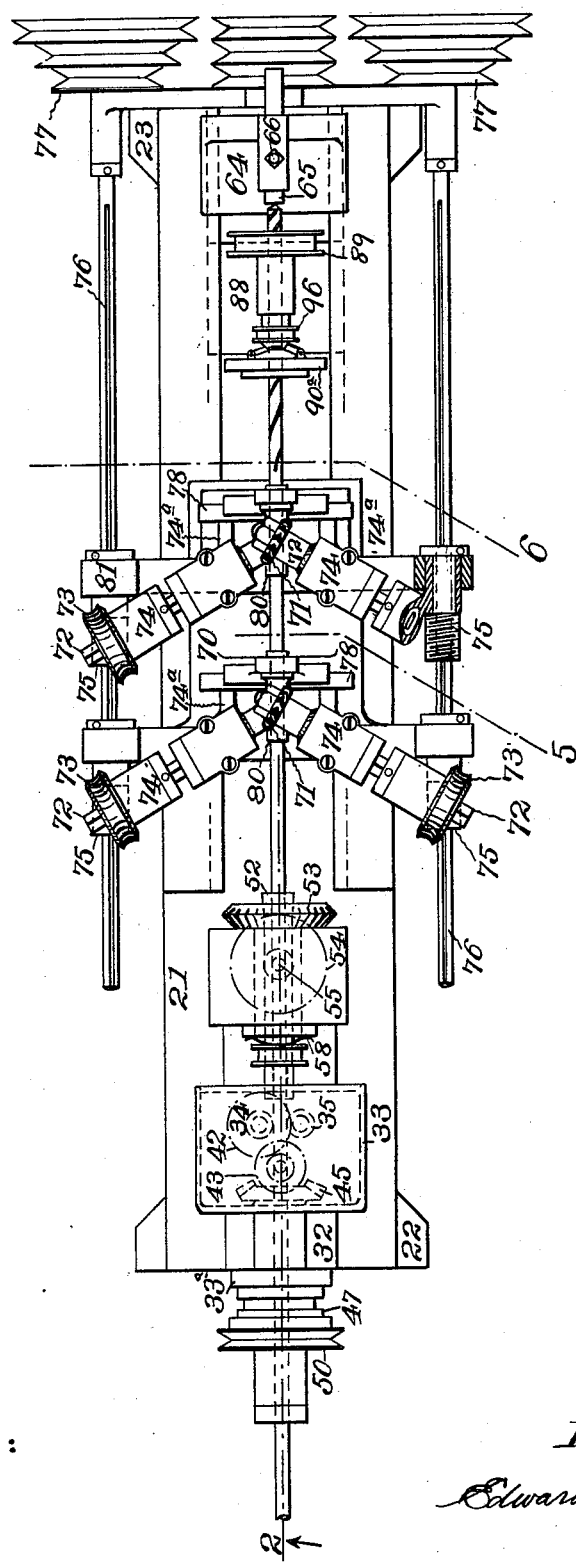
Figure 5:
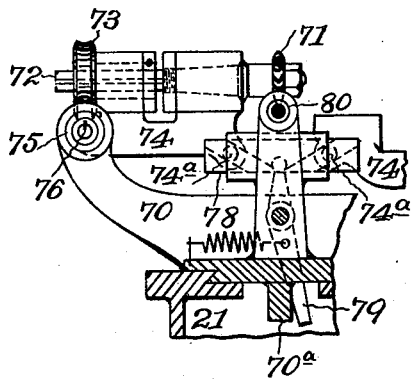
Figure 6:
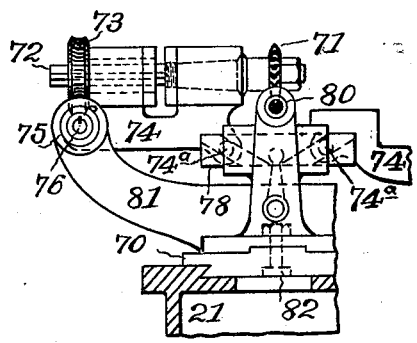
Figure 4:
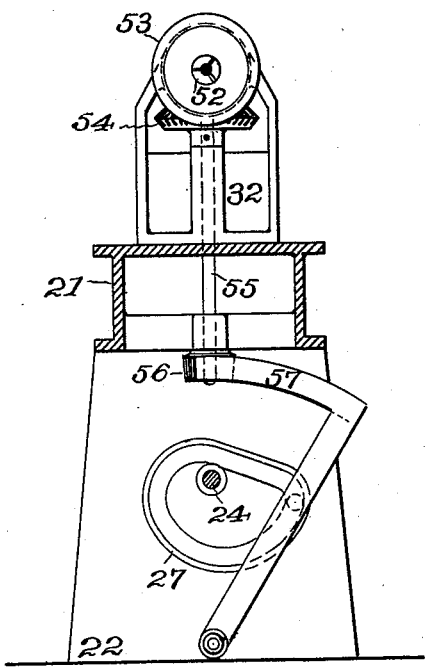
Figure 3:
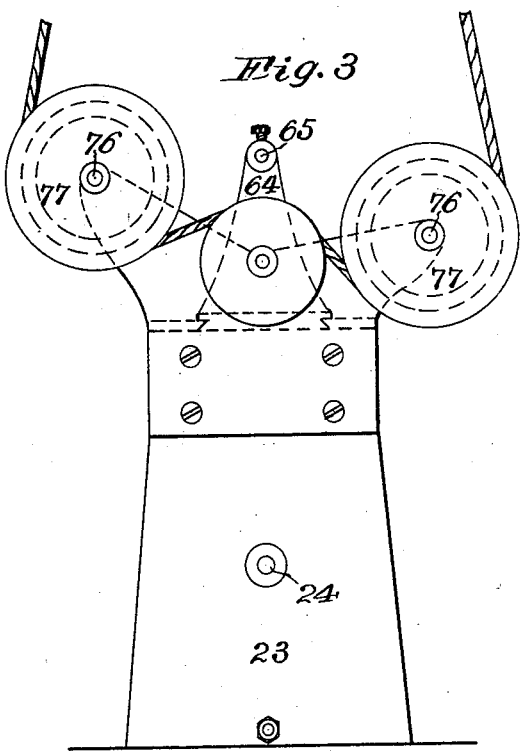
Figure 11:
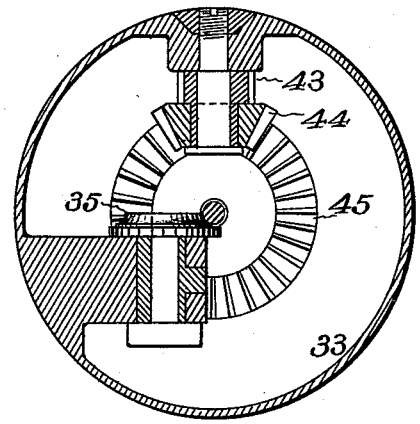
Figure 12:
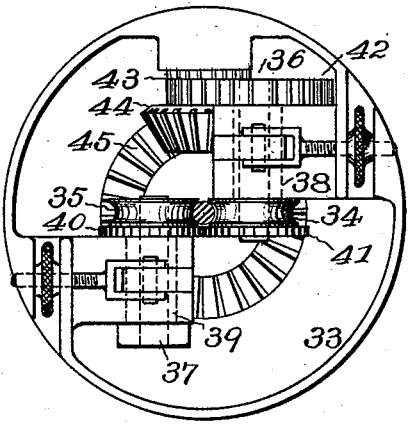
Figure 13:
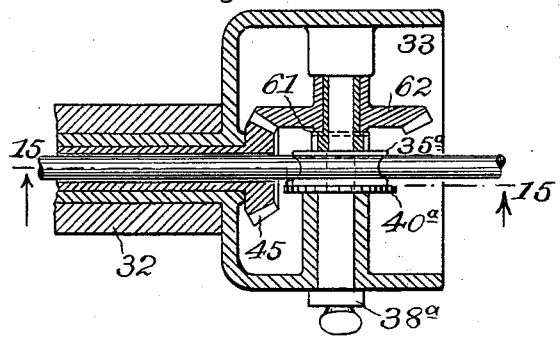
Figure 14:
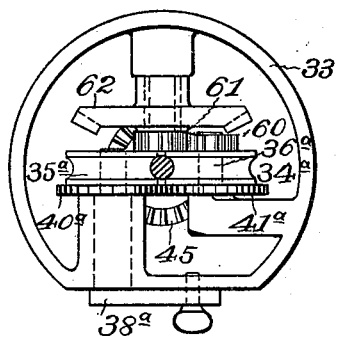
Figure 15:
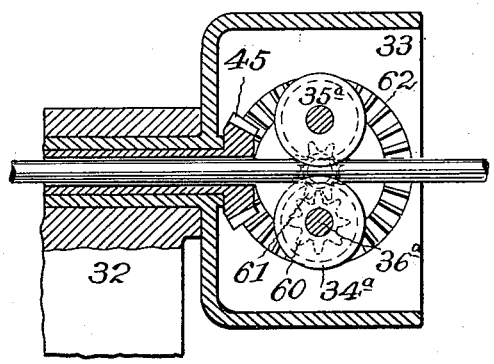
Figure 16:
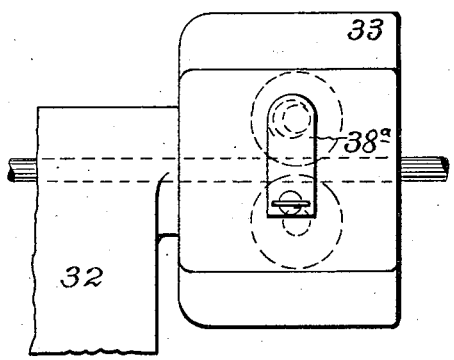

In the accompanying drawings, Figure 1 is a plan view of my improved twist-drill machine. Fig. 2 is a front view of what is shown in Fig. 1, partly in section, taken on line 2 of Fig. 1. Fig. 3 is a right-hand end view of Fig. 2. Fig. 4 is a sectional end view on lines 4 4 of Fig. 2. Fig. 5 is a partial section on line 5 of Fig. 1, and Fig. 6 is a similar view on line 6 of that same figure. Figs. 7, 8, 9, and 10 are enlarged views of the severing or cutting-off head, Fig. 7 being a front view, Fig. 8 a sectional side view, Fig. 9 a plan view, partly in section, and Fig. 10 a section on line 10 10 of Fig. 8. Figs. 11 and 12 are enlarged views of the wire-feeding device, Fig. 11 being taken on lines 11 11 of Fig. 2, and Fig. 12 an end view looking into the head. Figs. 13 to 16, inclusive, show a modified form of the wire-feeding device. Fig. 13 shows a plan view in section; Fig. 14, an end view looking into the head; Fig. 15, a front view in section, taken on line 15 15 of Fig. 13, and Fig. 16 an outside front view. Fig. 17 represents a rod upon which two pairs of cutters have operated and nearly completed the spiral grooves, the incompleted spiral being shown in dotted lines, and the severing or cutting-off tool having severed one blank and beginning to operate upon the other. Fig. 18 is a similar view to that of Fig. 17 with only one pair of cutters in operation.

A description will first be given of the construction and operation of each section of the machine, and afterward their combined mode of operation will be described.

The numeral 21 represents the bed of the machine, which may be suitably supported by the legs 22 and 23, into which is journaled the cam-shaft 24, carrying the wire-feed cam 25, the chuck-cam 26, the rotating-cam 27, the depth-cam 28, the carriage-cam 29, and cutting-off cam 30. These cam-wheels are provided with detachable cam-strips, which are adjusted or replaced to give the desired motions. Loosely journaled upon the cam-shaft on the outer left-hand end of the machine is the pulley 31, receiving motion from an overhead counter-shaft, and which transmits its motion through the train of gearing to the cam-shaft 24. The bracket 32 carries journaled thereon, concentric with the wire rod, the wire-feed head 33, and that head carries the wire-feed rolls 34 and 35, fastened on shafts 36 and 37 and journaled in eccentric bushings 38 and 39, respectively. By means of the eccentric bushings the rolls 34 and 35 may be adjusted so as to properly hold different sizes of wire. Integral with roll 35 is the gear 40, meshing with gear 41 on shaft 36, which carries on its other end the gear 42, meshing into pinion 43, on the hub of which is mounted the bevel-pinion 44, meshing into the bevel-gear 45, and which is journaled concentrically with the wire and the head in the bracket 32. On the rear end of the hub of the head 33 is fastened the friction-collar 33ᵃ, and on the rear end of the hub of the bevel-gear 45 is held by spline or feather the friction-sleeve 47, which may receive an axial motion by the bifurcated bell-crank 48 and cam 25. The spring 49 holds the friction-sleeve, by means of the bell-crank, in its normal position in engagement with the friction-collar 33ª of the head 33.

50 is a pulley receiving a rotary motion from any convenient overhead counter-shaft, and when the friction-sleeve 47 is brought into engagement therewith, by means of the cam 25, imparts a rotary motion to the bevel-gear 45 and its train of gears to the feed-rolls 34 and 35, thus feeding the wire forward at the desired speed and intervals. When the wire is fed forward far enough, the cam 25 disengages the bell-crank 48 and the spring 49 draws the bell-crank back to its normal position, that is, into engagement with the friction-collar 33ª of the head 33, and the feed-rolls revolve in unison axially with the head, but do not rotate on their shafts.

In Figs. 13 to 16, inclusive, a modification of the feeding device is shown, and it consists of the head 33, carrying the feed-rolls 34ª and 35ª, journaled on the shaft 36ª, and the eccentric stud 38ª, respectively, by which the rollers may be adjusted so as to properly hold the different sizes of wire. Integral with the roller 35ª is the gear 40ª, meshing into the gear 41ª, and which is fastened to the roll 34ª. Integral with the roller 34ª is also the pinion 60, meshing into the gear 61, which has fastened to its hub the bevel-gear 62, and which again meshes into the bevel-pinion 45, journaled concentrically with the wire rod and the head in the bracket 32. It will be hereinafter explained that in this class of machines the head 33 with the wire will revolve very slowly, but it is equally well applicable to machines where greater speed is required, as, for instance, a wire-feed device in screw machinery. In that case it would be preferable to have the pulley 50 a stationary hub of the bracket 32, and when the friction-sleeve 47 is brought into engagement therewith, by means of cam 25, the rotating head 33 will cause the feed-rollers to revolve and feed the wire forward. I have also shown only one eccentric bushing for adjusting the roll to and from the center, in which case the rolls must be the exact size to hold the wire central with the bevel-gear, and the eccentric bushing is used for clamping purposes only.

The chuck 52 holds and rotates the wire the desired speed, which is in this class of machines very slow, to give the increased twist, and is operated as follows: Upon the forward end of the bracket 32 is journaled the bevel-gear 53, meshing into the gear 54 on shaft 55, and which carries on its lower end the pinion 56, meshing into the sector 57, and which is operated by the cam 27. The chuck 52 is connected at its rear end with the head 33, so that the rotary motion communicated to the chuck will also revolve the head 33. The front end of the chuck is of a conical shape and split, of regular split-chuck pattern, and is fitted to the bevel-gear 53, so that when the same is drawn back by the spring 58 the chuck will be forced into its conical seat, and thus close and grasp the wire rod and rotate with the bevel-gear as it is operated by the cam 27. When the wire is to be fed forward, the chuck releases its hold on the wire rod by forcing the lever 59 by means of cam 26 in the direction of which the wire is to be fed by the feeding-rolls 34 and 35.

It is obvious that the chuck 52 could be dispensed with altogether, as the rolls 34 and 35 grasp and firmly hold the wire from being forced back by the milling-cutters as the cutter-head slide is fed toward that head. I prefer to use the chuck, however, as it steadies the wire much better, especially on small stock.

Upon the bed 21 is carried the cutter-head slide 70, in which two sets of milling-cutters operate in opposite and corresponding positions, so that the cutters shall operate simultaneously upon diametrically opposite sides of the blank. The milling-cutters 71 are carried by their shafts 72, one above the other below the plane of the drill-blank, and have fastened thereto by spline or feather the worm-wheels 73, and are journaled in the arms 74, which are pivoted to the slide concentrically with the worms 75, and which are splined to shafts 76, which receive their motion from the cones 77. The cutter-head slide 70 carries a projection 70ª, which engages with the cam-strip of cam-wheel 29 and moves the slide forward in the direction of the length of the wire at the required rate during the grooving or spiraling operation. The depth of the groove changes throughout its length, the same being the greater at the cutting edge, as at $a$, Fig. 17, and gradually diminishing toward the shank of the drill. For this purpose the arms 74 are provided with projection 74ª, (see Figs. 5 and 6,) engaging angular grooves in the lateral sliding cam 78, operated by the lever 79 and its cam 28. Above the lateral sliding cam 78 is mounted the bushing 80 in the cutter-head slide 70, which serves to steady and guide the wire while grooving, the milling-cutters 71 operating through openings in said bushing in the usual manner. To permit the grooving on different lengths of drill-blanks, the rear cutter-head 81 is adjustably clamped on the cutter-head slide by means of bolt 82.

The cutting-off device is best shown on an enlarged scale in Figs. 7 to 10, inclusive. It consists of a rotary spindle 90, with a head 90ª, upon which is carried the cross-slide 91 in ways or guides 92, and to which is clamped the cutting-off tool 93. To the right-hand end of said spindle 90 is fastened a pulley 89, receiving a rotary motion from any convenient counter-shaft above. To the head 90ª is pivoted one end of a toggle-arm 95, whereas the other toggle-arm 95ª is pivoted to the cross-slide 91, which is operated by the bifurcated lever 97 and cam-strip 30ª to carry the cutting-off tool to and from the center of the rod. The spindle with its head is rotated by pulley 89 and mounted in the carriage 88, which is provided with the downward-pointing projection 87 and engaging with the cam 30, capable of moving to one position and severing the first blank and then moving to the second position and severing the second blank.

At the end of the machine is mounted on the bed a bracket 64, carrying a stop 65, which may be adjusted by the set-screw 66, against which the wire abuts as it is fed forward by the feeding rolls 34 and 35.

Different sizes of feed-rolls 34 and 35, chucks 52, and bushings 80 are to be substituted to fit the different diameters of wires.

The consecutive operation of the machine as a whole is as follows: A rod of wire of proper size is inserted into the central opening of the pulley 50, the bevel-gear 45, and between the grooved feed-rolls 34 and 35, the chuck 52, and the bushings 80, so that the end of the rod is directly under the intersecting line of the planes going through the axes of the two farther milling-cutters. The eccentric bushings 38 and 39 are then adjusted so that the wire is firmly gripped between the feeding-rolls 34 and 35. The spring 58 draws the chuck 52 solidly into its conical seat of the bevel-gear 53, thus gripping the wire firmly and connecting same with that bevel-gear 53. The milling-cutters are now ready to operate upon the rod, and having received a rotary motion from the cones 77 are first brought toward each other by lowering the upper set of cutters and simultaneously elevating the lower set of cutters until the required depths of the grooves are attained by means of the lateral sliding cam 78 and cam-wheel 28. Then the carriage 70 is gradually moved toward the shank-forming end of the drill-blank by the cam-wheel 29, at the same time giving the wire a rotary motion by means of the cam 27 and its intermediate mechanisms to give the grooves the required twist, and also simultaneously separating the cutters to give the diminishing depth of the groove by giving the cam 78 the lateral movement by means of cam-wheel 28. The chuck 52 then releases its hold upon the wire by being forced forward by cam 26 and lever 59 toward the milling-cutters. The wire may then be fed forward by rolls 34 and 35 until the end abuts against the stop 65. In the meantime the milling-cutter slide has been returned to its starting position and may begin its operation, while the cutting-off head moves to one position and severs the first blank and may be immediately moved to the second position to sever the second blank.

In the drawings I have shown the machine with two sets of cutters, but it is equally well adapted for only one set of cutters or more than two sets of cutters.

Having thus fully described my invention, I claim as new and desire to secure by Letters Patent—

1. In a machine for making twist-drills from a rod, the combination of mechanisms for feeding the rod in the direction of its length against the stationary stop 65, of mechanisms substantially as described for clamping the rod and rotating the same, milling-cutters adapted to operate upon the same to mill the decreasing depths, the bushings to steady and guide the same and cutting-off mechanism all combined and operating substantially as described.

2. In a machine for making twist-drills from a rod, the combination of mechanisms for feeding the rod in the direction of its length, the chuck 52, adapted to hold the rod and capable by means substantially as described of a rotary motion, a pair of oppositely-disposed cutters mounted on spindles at an incline to the axial line of the wire rod, the cutter-head slide 70, and cam 29, all combined and operating to advance the cutters in the direction of the length of the rod, while the same is rotated substantially as described.

3. In a machine for making twist-drills from a rod, the combination of mechanisms for feeding the rod in the direction of its length, the chuck 52 adapted to hold the rod and capable by means substantially as described of a rotary motion, the bushings 80 to steady and guide the wire, the plurality of pairs of oppositely-disposed cutter-carrying spindles mounted at an incline to the axial line of the wire, the arms 74, the lateral moving cam-slide 78, the cutter-head slide 70, and cam 29 all combined and operating to advance the milling-cutters in the direction of the length and radially separating the same from the center of the wire rod, substantially as described.

4. In a machine for making twist-drills from a rod, the combination of mechanisms for feeding the rod in the direction of its length, the chuck 52, adapted to hold the rod and capable by means substantially as described, of a rotary motion, the bushings 80 to steady and guide the wire, the plurality of pairs of oppositely-disposed cutter-carrying spindles mounted at an incline to the axial line of the wire, the arms 74, the lateral moving cam-slide 78, the cutter-head slide 70, and cam 29 all combined and operating to advance the milling-cutters in the direction of the length and radially separating the same from the center of the wire rod, the cutting-off device to sever the drill-blanks as they are presented beyond the bushings, all combined and operating substantially as described.

5. The combination of the chuck adapted to hold a rod and capable, by means substantially as described, of a rotary motion, a plurality of pairs of oppositely-disposed cutter-carrying spindles mounted at an incline to the axial line of the wire, the cutter-head slide 70 and cam 29 all combined and operating to advance the cutters in the direction of the length of the rod while the same is rotated substantially as described.

6. In a machine for making twist-drills, the bushings 80 to steady and guide the wire, the plurality of pairs of oppositely-disposed cutter-carrying spindles mounted at an incline to the axial line of the wire, the arms 74, the lateral moving slide 78, the cutter-head slide 70 and cam 29, all combined and operating to advance the milling-cutters in the direction of the length, and radially separating the same from the center of the wire rod, substantially as described.

7. The combination of the chuck 52 adapted to hold a rod and capable, by means substantially as described, of a rotary motion, two oppositely-disposed cutter-carrying spindles mounted at an incline to the axial line of the wire rod in arms, and the lateral sliding cam 78, provided with grooves with which said arms engage all substantially as described and for the purpose set forth.

8. A rotary head provided with a pair of rolls adapted to grip and hold a wire rod between them, a central mounted bevel-gear which is held in its normal position in engagement with that head, connecting mechanisms between the bevel-gear and the rolls, and means substantially as described adapted to impart to the bevel-gear a relatively different movement than that of the head to feed the wire in the direction of its length, substantially as described.

9. The combination of a rotary head provided with a pair of feed-rolls, arranged at each side of the wire rod and geared together by the gears 40 and 41, eccentric bushings supporting the shafts of the feed-rolls, and adapted to adjust the rolls to and from each other; the bevel-gear 45 mounted concentrically with the wire rod, the friction-sleeve 47 and pulley 50 for imparting to the bevel-gear and the rolls a rotary motion to feed the wire in the direction of its length all combined and operating substantially as described.

10. The combination of a rotary head provided with a pair of feed-rolls, arranged at each side of the wire rod and geared together by the gears 40 and 41, eccentric bushings supporting the shafts of the feed-rolls, and adapted to adjust the rolls to and from each other; the gear 42 fastened to the shaft supporting one of the feed-rolls, the gear 43 mounted concentrically with the pinion 44, the bevel-gear 45 mounted concentrically with the wire rod, the friction-sleeve 47, and pulley 50, for imparting to the bevel-gear and the feed-rolls a rotary motion to feed the wire in the direction of its length all combined and operating substantially as described.

11. The combination of a rotary head provided with a pair of rolls, the eccentric bushings supporting the shafts of the feed-rolls, the gears 40 and 41 adjacent to the rolls, the gear 42 fastened to the shaft bearing one of said rolls, the gear 43, the bevel-pinion 44, and bevel-gear 45, all combined and operating substantially as described.

12. The combination of a rotary head provided with a pair of feed-rolls, arranged at each side of the wire rod and geared together by the gears 40 and 41, eccentric bushings supporting the shafts of the feed-rolls, and adapted to adjust the rolls to and from each other; the gear 42 fastened to the shaft supporting one of the feed-rolls, the gear 43 mounted concentrically with the pinion 44, the bevel-gear 45 mounted concentrically with the wire rod, the friction-sleeve 47, bell-crank 48, and cam 25 to disengage the friction-sleeve from the rotary head into engagement with the pulley 50 to impart to the bevel-gear and the feed-rolls a rotary motion to feed the wire in the direction of its length substantially as described.

13. The combination of the sliding carriage, the rotary head mounted thereon, the tool-carrying cross-slide, the toggle connecting the head and the cross-slide, and the longitudinal sliding sleeve engaging the toggle and carrying the cross-slide across the face of the head when the sleeve is operated, substantially as described.

14. The combination of a revolving head, a tool-carrying cross-slide mounted thereon, a toggle pivoted at one end to the head, and the other pivoted to the cross-slide, and a longitudinal sliding sleeve adapted to operate the knuckle of that toggle and to carry that cross-slide across the face of the head, all substantially as described.

15. The combination of the revolving head 90$^a$, the tool-carrying cross-slide 91 mounted thereon, the toggle 95 adapted to be operated by the sleeve 96, the lever 97 and cam-strip 30$^a$, substantially as described.

EDWARD E. CLAUSSEN.

Witnesses:
A. MUTTER,
F. K. CASWELL.